United States Patent [19]

Strumbos

[11] Patent Number: 4,804,155
[45] Date of Patent: Feb. 14, 1989

[54] VTOL AIRCRAFT

[76] Inventor: William P. Strumbos, 85 Middleville Rd., Northport, N.Y. 11768

[21] Appl. No.: 20,352

[22] Filed: Mar. 2, 1987

Related U.S. Application Data

[63] Continuation of Ser. No. 600,032, Apr. 12, 1984, abandoned.

[51] Int. Cl.$^4$ .................. B64C 3/10; B64C 29/00
[52] U.S. Cl. .................. 244/12.6; 244/34 A; 244/51; 244/52; D12/335
[58] Field of Search .................. 244/12.1, 12.4, 12.5, 244/12.6, 23 D, 34 A, 51, 52, 110 B, 55; D12/335, 336

[56] References Cited

U.S. PATENT DOCUMENTS

| D. 273,005 | 3/1984 | McComas | D12/335 |
|---|---|---|---|
| 1,814,115 | 7/1931 | Blain | 244/12.1 |
| 1,824,250 | 9/1931 | Wells | 244/12 |
| 1,987,607 | 1/1935 | Davis | 244/14 |
| 2,419,780 | 4/1947 | Jordan | 244/12 |
| 2,510,959 | 6/1950 | Custer | 244/12.6 |
| 2,611,556 | 9/1952 | Custer | 244/12.6 |
| 2,846,164 | 8/1958 | Haberkorn | 244/34 A |
| 2,929,580 | 3/1960 | Ciolkosz | 244/12.5 |
| 2,937,823 | 5/1960 | Fletcher | 244/12.6 |
| 3,017,139 | 1/1962 | Binder | 244/34 A |
| 3,065,929 | 11/1962 | Holland, Jr. | 244/34 A |
| 3,138,349 | 6/1964 | Piasecki | 244/34 A |
| 3,360,218 | 11/1967 | Miller | 244/12 |
| 3,655,150 | 4/1972 | Haberkorn et al. | 244/12.5 |
| 4,071,207 | 1/1978 | Piasecki et al. | 244/12.5 |

FOREIGN PATENT DOCUMENTS

| 719993 | 10/1965 | Canada | 244/12.1 |
|---|---|---|---|
| 398843 | 4/1909 | France | 244/34 A |
| 1209758 | 3/1960 | France | 244/34 A |

OTHER PUBLICATIONS

Wind in Architectural and Environmental Design; by Michele Melaragno; 1982 pp. 164, 168, and 177.
Wind Effects on Buildings and Structures; Ottawa, Canada, Sep. 11–15, 1967; International Research Seminar; pp. 1–18.

Primary Examiner—Galen Barefoot

[57] ABSTRACT

A VTOL aircraft having a fuselage with fixed ring wings on either side thereof. Each ring wing has a rearwardly extending nacelle associated with it. Each nacelle has a ring tail empennage at its after end and a propulsor fan in its nose operating in the bore of its associated ring wing. The propulsor fans provide propulsion thrust for conventional flight in which the flow created over the lifitng surfaces due to forward velocity of the aircraft generates lift for flight. The propulsor fans operate to induce a flow over the lifting surfaces to generate lift for VTOL flight without a requirement for forward velocity by the aircraft. Aerodynamic control means such as spoilers are provided in the ring wings and empennages for pitch, roll, and yaw control in conventional flight. Thrust reacting and vectoring means are provided in the empennages to vector propulsor fan slipstream in VTOL flight for pitch and yaw control and to react forward travel due to propulsor thrust such that fully controlled vertical flight is produced. A coordinated action of the spoilers in conventional flight and of the wing spoilers and thrust reacting and vectoring means in VTOL flight produces controlled moments transverse to the normal line of flight. In another embodiment, the aircraft has a single ring wing mounted substantially coaxially on the fuselage and a ring tail empennage mounted coaxially on the after end thereof. A propulsor fan operating in the bore of the wing provides propulsion thrust for conventional flight and "blows" the lifting surfaces for VTO1 flight. The empennage provides directional control for all phases of flight and also reacts and vectors propulsor thrust to control the aircraft and to regulate forward travel such that fully controlled VTO1 flight is obtained. In a further embodiment, a channel wing instead of a ring wing is used.

19 Claims, 12 Drawing Sheets

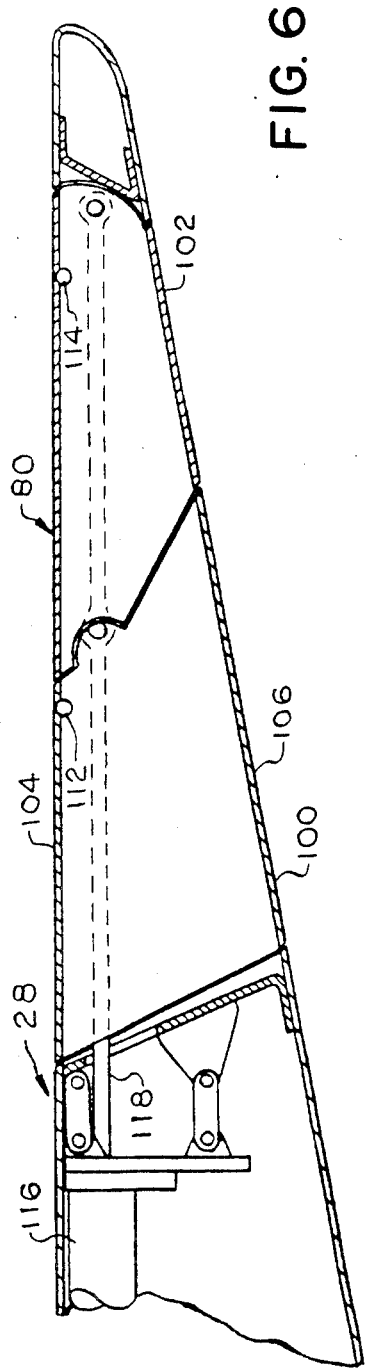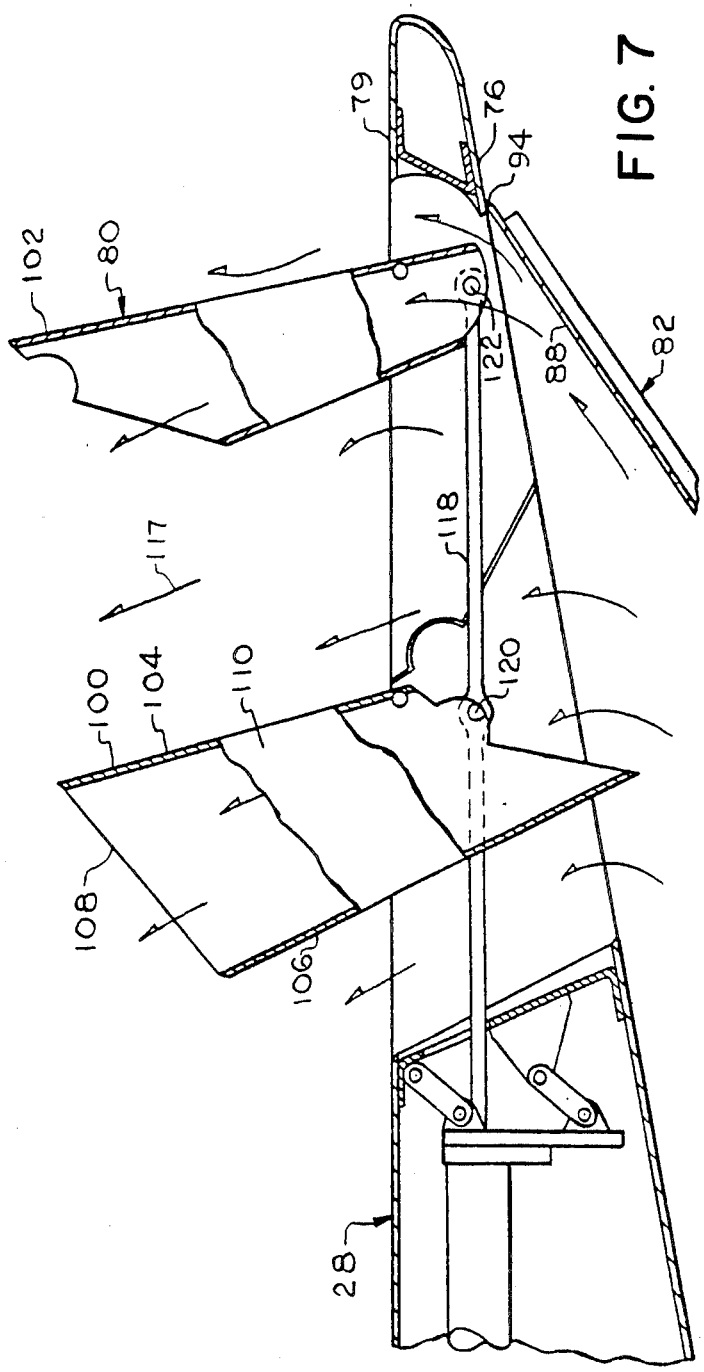

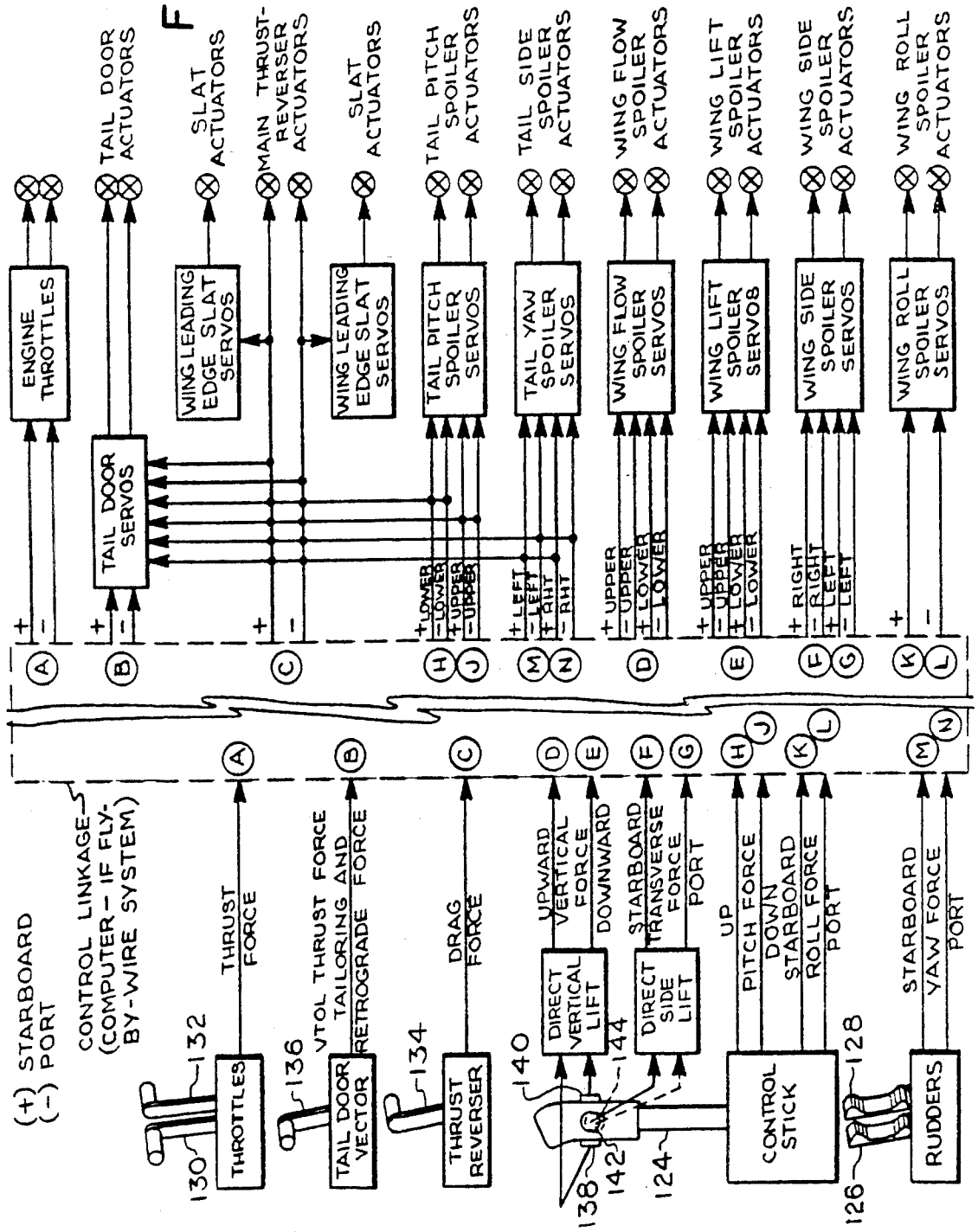

FIG. 21
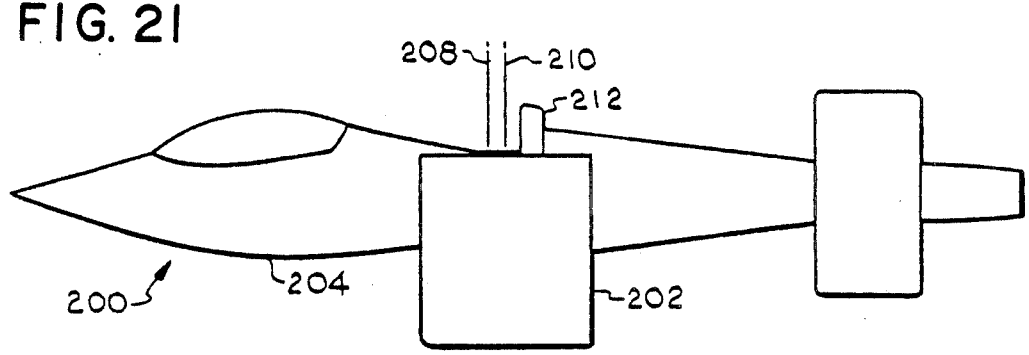
FIG. 22
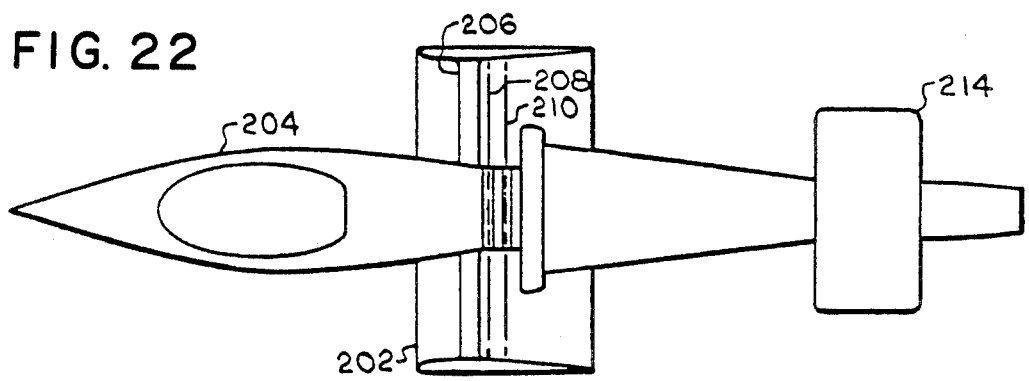
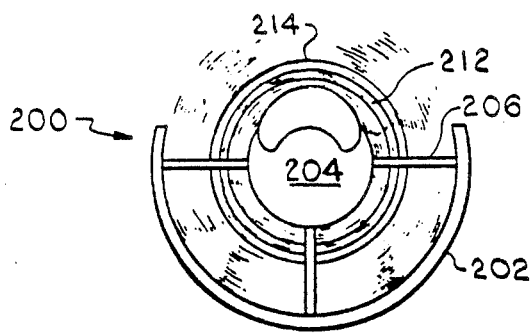
FIG. 23

VTOL AIRCRAFT

This is a continuation of application Ser. No. 600,032 filed Apr. 12, 1984, now abandoned.

FIELD OF THE INVENTION

This invention relates to vertical take-off and landing (VTOL) aircraft and, more particularly, to an aircraft that uses upper surface blowing of the lifting surfaces to generate lift coupled with a modulation or reaction of the propulsor thrust to achieve vertical flight.

BACKGROUND OF THE INVENTION

Over the past 50 years many versions of VTOL aircraft have evolved. VTOL aircraft may be conveniently classified in accordance with their method of converting vertical flight to horizontal flight. The first method is to provide a rotor or similar means rotating about a vertical axis for vertical flight and the entire aircraft is tilted for horizontal flight. A conventional helicopter fits into this category. After travelling vertically to a safe distance off the ground by the lift of its rotor, the pilot causes the aircraft to tilt in the direction he wants to go.

A second method is the tail-setting approach using craft nicknamed "pogos" because they are provided with means to allow them to be positioned on their tails and take off and land vertically. Phases of flight other than take offs and landings are flown with the longitudinal axis of the aircraft maintained in a substantially normal horizontal orientation. This method was made feasible by the advent of propulsion units that could produce an installed thrust to weight ratio greater than one.

Tilting only the rotors, propellers, or other sources of thrust is the third method of achieving VTOL operation. In some designs, the lifting surfaces provided also tilt along with the source of thrust, but in all aircraft falling into this category, the fuselage remains in its normal substantially horizontal orientation during take-off and landing.

The fourth method is to maintain the aircraft in its normally horizontal flight attitude but to deflect or vector thrust. High-velocity air forced back by propellers or the efflux from jet engines is turned downwards by means such as large flaps (deflected) or by means of nozzles (vectored).

Dual propulsion is the fifth method of achieving VTOL operation. In this category, the aircraft has separate engines dedicated to lifting and lowering the aircraft and separate engines for horizontal flight. Aircraft of this type are also called direct lift aircraft.

It will be recognized that the five preceding methods for achieving VTOL operation have one thing in common: the propulsion efflux is directed downward to produce lift by a consequent reaction to the downwash momentum. However, it is also known in the prior art that lift can be produced by yet another means which may be conveniently termed "upper surface blowing". Upper surface blowing comprises the acceleration of the flow over the upper surface of a body to create a drop in pressure thereover relative to the pressure on the under surface of the body, producing lift forces on that body. Upper surface blowing produces lift without a requirement for a turning downward of the flow that has passed over the body being lifted.

SUMMARY OF THE INVENTION

The VTOL aircraft of the invention in a preferred embodiment has a fuselage with a ring wing fixed on either side. Associated with each ring wing is a nacelle extending rearwardly therefrom with the longitudinal centerline of each nacelle lying parallel to the longitudinal centerline of the fuselage. At the nose of each nacelle is a propulsor fan operating in the duct of its associated ring wing. A ring empennage which is immersed in the slipstream from the propulsor fan (and ring wing) is provided at the after end of each nacelle. Spoilers fitted around the inside and outside peripheries of the ring wings and ring empennage provide directional control for conventional flight. In VTOL flight, the wing spoilers are used for directional control in conjunction with thrust vectoring means in the ring empennages, which means are also used to react propulsor thrust for hovering and for vertical flight.

In operation, the propulsor fans provide propulsion thrust to accelerate the aircraft for conventional flight in which the forward velocity of the aircraft produces an airflow over the lifting surfaces that generates lift for flight. Ring wings are efficient airfoils, thus the aircraft possesses the flying characteristics of a normal fixed wing aircraft both in engine-on and engine-off conventional flight. It can, therefore, be flown as a conventional aircraft with the propulsion fans providing the required propulsion thrust. For VTOL flight, the propulsor fans operate to induce a flow over the lifting surfaces to generate lift and, at the same time, the fan slipstream that has induced lift is reacted by the thrust vectoring means in the empennages to stop forward travel by the aircraft. The generating of lift without forward travel results in a lift vector that is straight up; i.e., hovering or vertical flight. The spoilers or similar aerodynamic control means in the ring wings and empennages provide pitch, roll, and yaw control in conventional flight. The thrust reacting and vectoring means in the ring empennages vector propulsor fan slipstream for pitch and yaw control and react propulsor thrust such that fully controlled hover and vertical flight is achieved. A coordinated operation of the spoilers in conventional flight and of the wing spoilers and thrust vectoring means in VTOL flight produces controlled moments transverse to the normal line of flight.

In another embodiment of the VTOL aircraft of the invention, the aircraft has a single ring wing fixedly mounted substantially coaxially on the fuselage and a ring tail empennage mounted on the tail end thereof. A propulsion fan operating in the bore of the wing provides propulsion thrust for conventional flight, and "blows" the lifting surfaces for VTOL flight. In this embodiment, also, the empennage provides directional control for all phases of flight and also reacts propulsor thrust to control forward travel of the aircraft along its longitudinal axis such that VTOL flight is obtained. In a further embodiment of the aircraft of the invention, a channel wing instead of a ring wing is used.

DESCRIPTION OF THE PRIOR ART

As discussed previousLy herein, the upard force producing flight in conventional heavier-than-air VTOL aircraft is usually generated by moving a mass of air downward. Or in terms of impulse and momentum: an upward impulse is the result of changing the downward momentum of a mass of air. In the case of a wing, it is the downwash produced by the wing that generates the lift. In the case of the rotor in helicopters and the like, it is again the downwash produced by the rotor blades. And in the case of a rocket or downward pointing or vectored jet engine, it is the momentum of the downward blast that produces the upward force. In each of these cases, the principles are the same; only the mechanism is different.

However, the prior art also shows that it is known to generate lift solely by upper surface blowing. The prior art teaches that it is not required to provide an upward impulse on the aircraft to produce lift as the result of changing the downward momentum of a mass of air. There are also designs shown in the prior art in which it is proposed, not only to generate lift by upper surface blowing, but also to react the horizontal forces produced by the propulsion means such that vertical flight capabilities are obtainable. Designs of that type are disclosed by D. W. Wells (U.S. Pat. No. 1,824,250), R. W. Davis (U.S. Pat. No. 1,987,607), L. F. Jordan (U.S. Pat. No. 2,419,780), and W. S. Miller (U.S. Pat. No. 3,360,218). Wells discloses a design having propulsors on either side of a centrally-located fuselage, the propulsors being mounted to generate lift by upper surface blowing. In the design, it is proposed to cancel or reduce horizontal travel of the aircraft by rotating the propulsors about a vertical pivot into a position transverse the longitudinal axis such that the propulsors produce a span-wise blowing to generate vertical lift. In Davis, lift is generated by a chord-wise upper surface blowing of the wing by a multiplicity of propulsors and vertical flight is proposed by reversing the direction of thrust of one-half of the propulsors such that there is a cancellation of horizontal travel. A combination of the techniques of Wells and Davis are used in Miller who, in addition, provides a system of vertical vanes which are deployed into the efflux of the propulsion means to vector the thrust thereof for cancelling horizontal travel such that vertical lift is achieved. In the prior art, however, only Jordan provides means for insuring a flow of air over the empennage to thereby address the critical problem of control during hover or vertical flight. And Jordan teaches a design having propulsors on either side of a fuselage. These propulsors and the semi-span of the wings on which they are mounted rotate about a vertical pivot to a position facing one another such that the propulsors suck air off a "vacuum wing" on the top of the fuselage to generate vertical lift. Because the design of Jordan requires the propulsors and wing semi-spans to rotate 90 degrees to go from horizontal to vertical flight, his design as well as the other VTOL designs in the prior art will experience difficulty in the critical transition phase between horizontal and vertical flight. It is believed that this factor is the reason why, to my knowledge, there has never been a demonstration in the prior art of practical upper-surface-blown VTOL flight.

Thus, it is a principal object of the invention to provide a VTOL aircraft having the propulsors thereof blowing the wings to generate lift by upper surface blowing, the slipstream from the propulsors that is producing lift also reacting with a ring tail empennage system to provide positive control during all phases of flight, with thrust vectoring means in the empennage reacting horizontal travel of the aircraft such that vertical flight is achieved.

It is another object of the invention to provide a VTOL aircraft in which the forces created for sustaining a fixed wing aircraft in flight are generated by producing a drop in the flow-induced fluid pressure on the upper surface relative to the pressure on the lower surface of the airfoil and, further, to maintain as high a rate possible of flow over the upper surface of the airfoil while slowing or stagnating the flow over the bottom surface of the airfoil.

A further object of the invention is to provide a VTOL aircraft in which an airflow induced by the propulsion system of the aircraft is used for blowing the upper surface of the airfoil and in which the lifting surface is formed into a ring or channel in which the propulsion means operates such that a maximum area of the lifting surface is subject to the blowing action of the propulsor.

A yet further object of the invention is to provide a VTOL aircraft having ring wings and ring tails with spoilers fitted around the inside and outside of the peripheries of the wing wings and tails and thrust vectoring means around the peripheries of the ring tails such that a coordinated operation of the spoilers and vectoring means will produce control forces in any selected direction transverse the longitudinal axis of the aircraft.

DESCRIPTION OF THE DRAWINGS

For the purpose of illustrating the invention there is shown in the drawings the form which is presently preferred; it should be understood, however, that the invention is not necessarily limited to the precise arrangements and instrumentalities here shown.

FIG. 6 is a fragmentary cross-sectional view of the peripheral door system of the empennage of the aircraft embodied in FIG. 1 in the conventional flight configuration;

FIG. 7 is a fragmentary cross-sectional view of the peripheral door system of FIG. 6 in the VTOL configuration;

FIG. 8 is a diagram of a flight control system for the VTOL aircraft of the invention;

FIG. 21 is a side elevation of another embodiment of the VTOL aircraft of the invention in a conventional flight configuration;

FIG. 22 is a top plan view of the aircraft embodied in FIG. 21; and

FIG. 23 is a front elevation of the aircraft embodied in FIG. 21.

DESCRIPTION OF THE PREFERRED EMBODIMENTS

Figure 1:
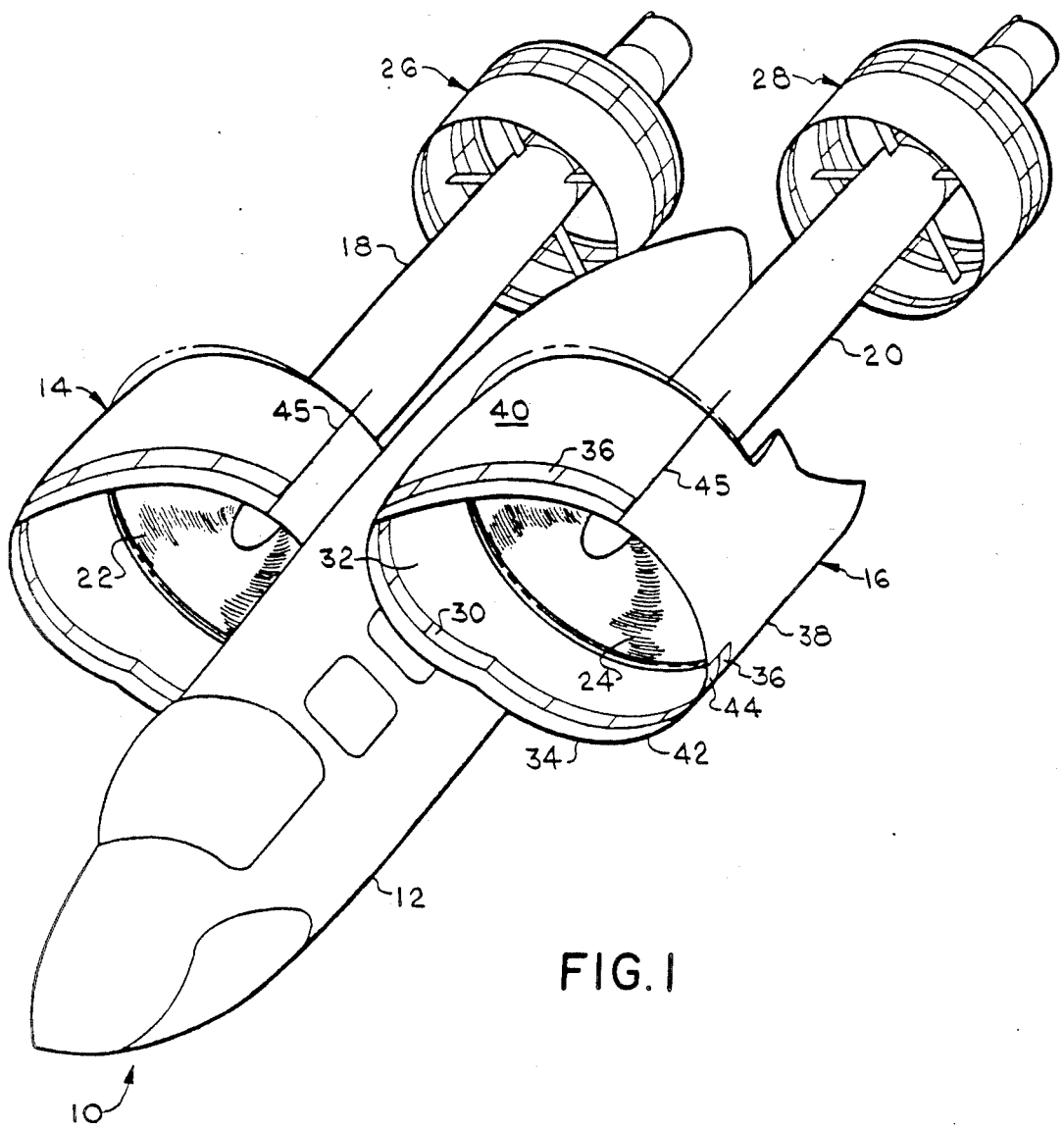
FIG. 1 is a perspective view of a preferred embodiment of the VTOL aircraft of the invention in a conventional flight configuration.

With reference now to FIG. 1 in particular of the drawings, a preferred embodiment 10 of the VTOL aircraft of the invention has a fuselage 12; fixed ring wings 14, 16 on either side of the fuselage; nacelles 18, 20 associated with the ring wings; propulsion means 22 and 24 in the noses of the nacelles; and a ring tail empennage system 26 and 28 at the after ends of the nacelles. It will be recognized that ring wing 14 and its associated nacelle 18 and other components are substantially a mirror image of ring wing 16 and its nacelle 20 and other components; thus, in the interest of brevity, the following detailed description of one ring wing and its associated components will be understood to apply with obvious variations to the other ring wing and its associated components.

Figure 2:
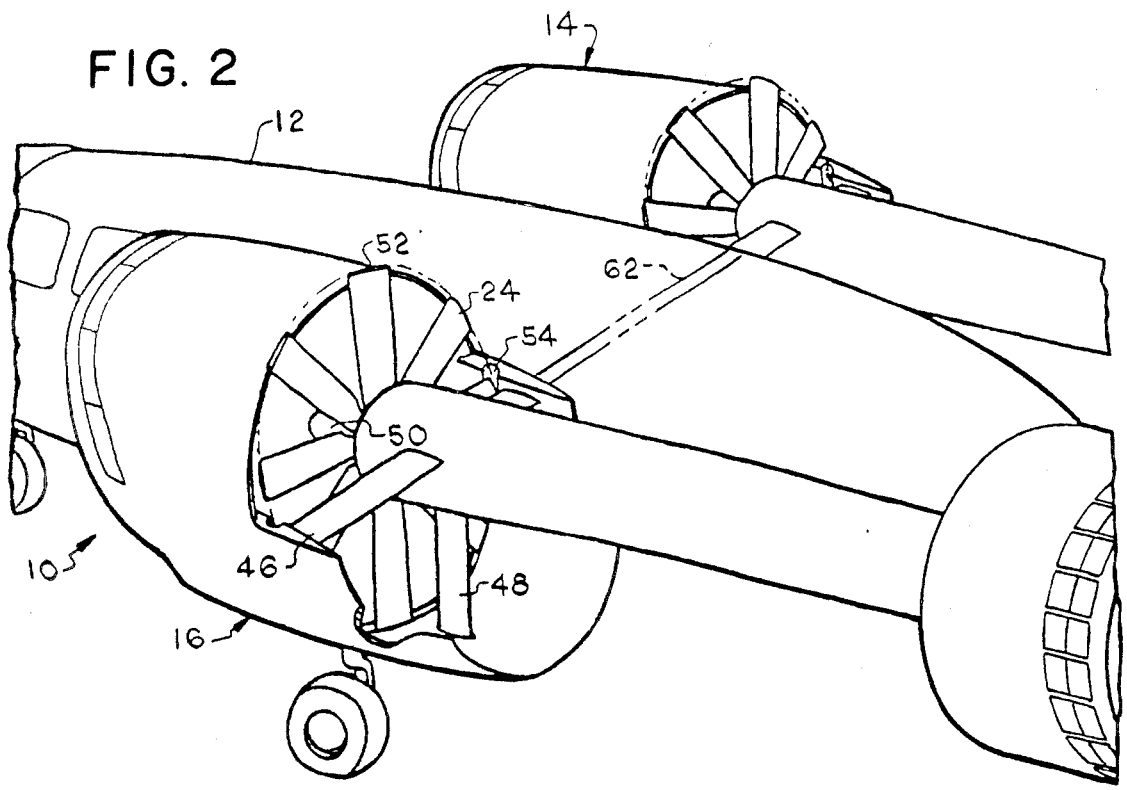
FIG. 2 is a fragmentary perspective view of the aircraft embodied in FIG. 1 showing the aircraft on the ground.

Each ring wing has a series of deployable spoilers 30 encircling the inside periphery or throat 32 of the wing parallel to the leading edge 34 thereof. A second series of deployable spoilers 36 are located parallel to the leading edge 34 on the outside periphery 38 of the wing at least in the upper 40 and lower 42 sectors of the wing. Although the spoilers 30 and 36 are shown located near the leading edge of the wing, it will be understood that their location will be governed by aerodynamic considerations and can differ from that shown. In addition, deployable circulation control slats 44 are provided in the lower outside quadrant of the wing leading edge. As is known, means such as chord-wise fences 45 can be fitted on the wings for circulation control. The nacelle is suitably mounted in the wing with appropriate means such as struts 46 and 48. The propulsor fan 24 is mounted for operation in the nose of the nacelle and means such as a spinner 50 can be provided to streamline the installation. As shown in FIG. 2, the wing and the propulsor fan can be sized and positioned such that the tips 52 of the fan in their upper arc of travel operate to "suck" the flow from the top sector of the wing. An annular groove 54 can be provided in the inside of the wing to accommodate the tips of the fan to counter problems with clearance, tip losses, vibration, and the like.

Figure 3:
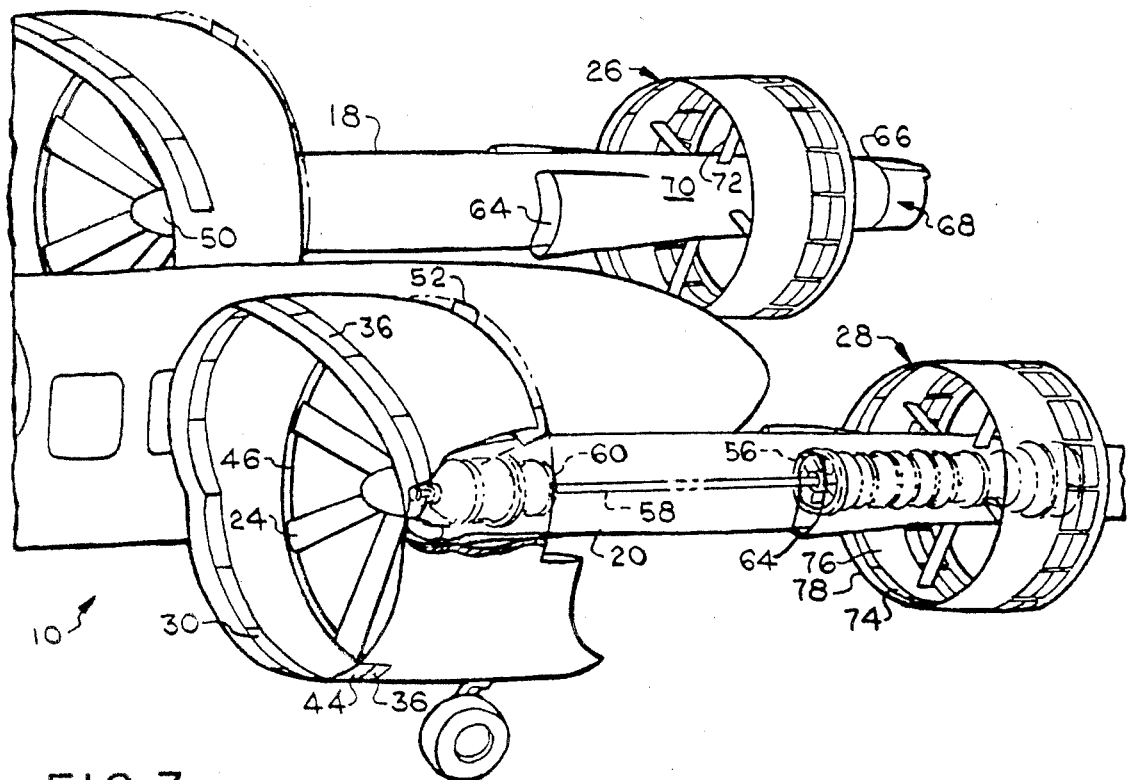
FIG. 3 is a fragmentary perspective view partially in section of the aircraft embodied in FIG. 1 showing another view of the aircraft on the ground.
Figure 4:
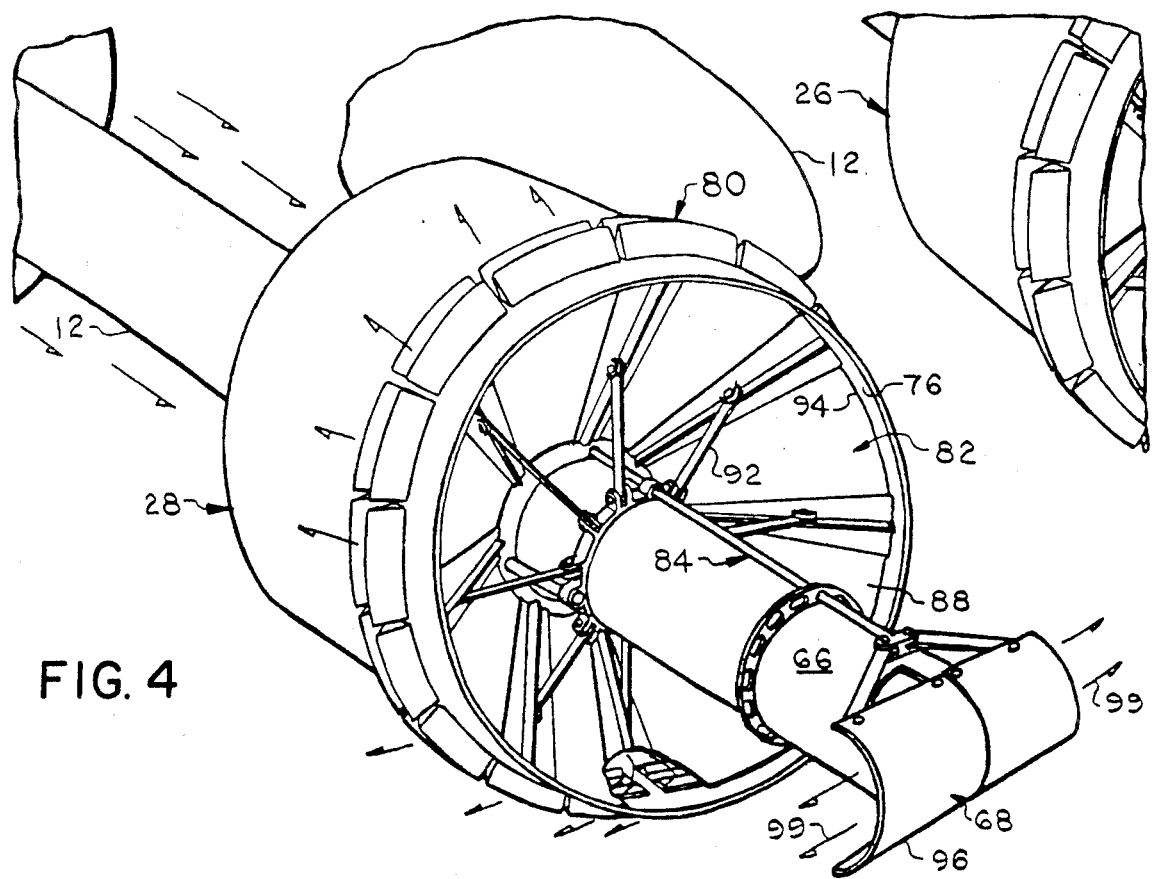
FIG. 4 is a fragmentary perspective view partially in section of the aircraft embodied in FIG. 1 in the VTOL configuration.
Figure 5:
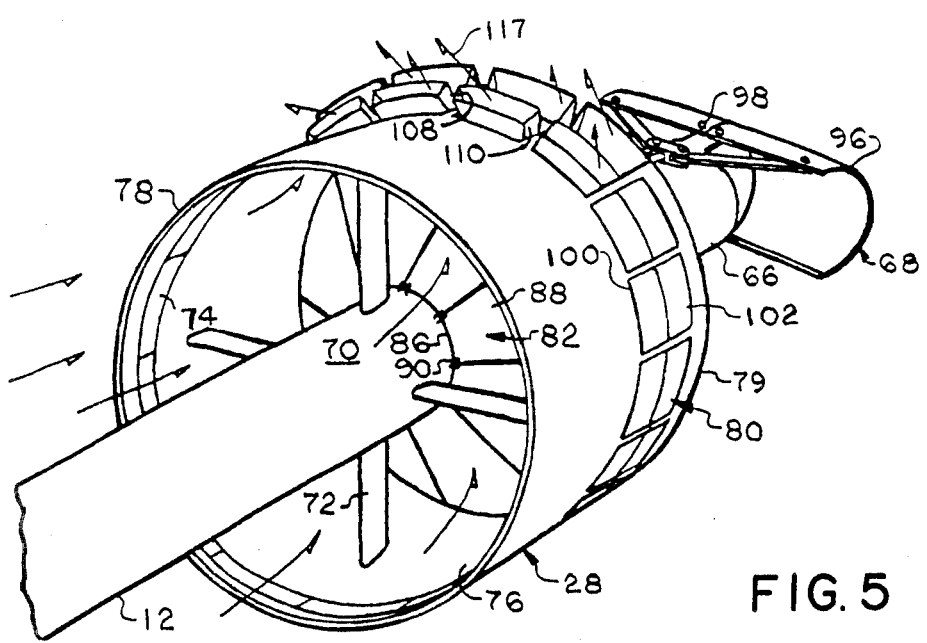
FIG. 5 is a fragmentary perspective view of one of the empennages of the aircraft embodied in FIG. 1 in the VTOL configuration.

Any suitable power plant can be used to drive the fan 24; FIG. 3 shows a turboprop type installation having a gas turbine engine 56 driving the fan through a propeller shaft 58 and gear box 60 arrangement. As is well known, the power plant could also be located in the fuselage 12 instead of in the nacelle and appropriate shafting, gear boxes, and a suitable drive train can be used to drive the fans in the nacelles. As is also well known, cross shafting 62 can be provided for operation in an engine-out condition. The turbine engine can have air intakes 64 and the tail pipe nozzle 66 can be provided with a clamshell door type thrust reverser 68. The ring tail empennage system is mounted co-axially on the after end 70 of the nacelle by an appropriate tail strut 72 arrangement. (See FIGS. 4 and 5.) Each ring tail has a series of spoilers 74 encircling the inside periphery or throat 76 of the tail in any aerodynamic suitable location parallel to the leading edge 78 of the tail. Around the after end 79 of the ring tail is a thrust vectoring door system 80 which has an operative relationship with a tail blocker door system 82. A suitable linkage system 84 connects the blocker door system 82 for operation with the thrust reverser 68.

The leading edge 86 of the doors 88 of the blocker door system 82 are hinged on suitable pivots 90 spaced around the nacelle in the tail region 70 thereof. In their stowed condition, the doors are folded down in close streamlined proximity to the nacelle surface. When deployed, they are rotated about their pivots 90 by a suitable actuating lever arrangement 92 such that their trailing edges 94 are erected into contact with the inside periphery 76 of the ring tail near the trailing edge thereof to close off longitudinal flow through the ring tail. In their stowed condition, each door 96 of the thrust reverser 68 fits in close streamlined proximity against the tail pipe nozzle 66. When ring tail blocker doors 88 are deployed to close off the flow through the ring tail, linkage system 84 swings the thrust reverser doors 96 about their vertical pivots 98 on the upper and lower end surfaces of nozzle 66 to a position across the nozzle. With the doors 96 in this position, the efflux from the gas turbine engine is split and deflected laterally to opposite sides such that the reaction forces of the efflux, as indicated by directional arrows 99, are cancelled.

In keeping with common usage, the clamshell door system 68 is referred to herein as a thrust reverser; however, it will be understood that the claimshell doors are used mainly as thrust attenuating means in this invention rather than thrust reversers as in conventional practice and the thrust reversing function in this invention is served mainly by the blocker door system 82 in conjunctin with the thrust vectoring door system 80 of the ring tails.

As shown in FIGS. 4-7, system 80 comprises a series of pairs of doors 100, 102 around the periphery of the ring tail parallel to the trailing edge thereof. Each door has an outside surface 104, and inside surface 106, and side walls 108 and 110 joining the outside and inside surfaces such that an open-ended box-like configuration results. Doors 100 and 102 are pivotally mounted on pivots 112 and 114 respectively. Suitable actuators 116 are provided to selectively swing the doors between their opened and closed positions and intermediate settings therebetween by means of a suitable actuator link 118 pivotally connected to the doors by pivots 120, 122.

When the thrust vectoring doors 100 and 102 are closed as shown in FIG. 6, their outside 104 and inside 106 surfaces form a continuation of the outside and inside surfaces of the ring tail. This is their configuration in conventional horizontal flight. In this configuration, the lateral empennage forces required for control purposes are produced by a selected actuation of the spoilers 74 in the throat of the ring tail. In VTOL flight, however, longitudinal and lateral thrusts for control purposes are produced by a selective actuation of the thrust vectoring doors 100 and 102. For VTOL flight, the tail blocker door system 82 is employed to close off the after end of the ring tail and the doors 100 and 102 are opened selectively by the actuators 116 to a position in which the propulsor slipstream which is deflected by the blocker doors 88 is directed out the thrust vectoring doors as indicated by directional arrows 117 to poduce a radial control thrusts for VTOL flight.

In this invention in conventional powered flight, the propulsor fans 22 and 24 provide thrust to propel the aircraft in a normal manner during all phases of flight. In VTOL flight, the fans provide a flow over the airfoils to create lift and the fan slipstream is acted upon by the empennages to modulate horizontal travel and to supply full positive directional control. The ring wings and tails are efficient airfoils; thus, in unpowered conditions, the aircraft wil glide efficiently with the wings generating lift and the tails providing directional control such that a controlled forced landing can be made.

The pilot's controls in this aircraft (See FIG. 8) comprise a control stick 124; rudder pedals 126, 128; engine throttle levers 130, 132; and a thrust reverser lever 134. In addition to these more-or-less conventional controls, the pilot is provided with a tail peripheral door vector lever 136 and push buttons 138, 140 and 142, 144 on the control stick for commanding direct upward and downward vertical forces and direct starboard and port side forces respectively.

Control inputs by the pilot to provide three-dimensional guidance of the aircraft are transmitted by any suitable linkage arrangement to the control means or surfaces to activate them. Preferably the linkage is by a known "fly-by-wire" system in which electrical circuity is connected to electrical actuators at the control means or surfaces such that command input signals by the pilot produce the desired control response. (See FIG. 8.) Such control systems are well known and it thus is not believed necessary to go into greater detail with respect thereto.

Engine speed and power are controlled by the throttle levers 130, 132. The thrust reverser lever 134 is used to activate the tail vectoring door system 80, and to deploy and stow the blocker doors 88, the clamshell doors 96, and also the leading edge slats 44. Vector lever 136 controls the collective setting of peripheral doors 100 and 102 of the tail vectoring door system 80 about their pivots 112 and 114 to vector propulsion slipstream in VTOL flight for governing the thrust acting on the aircraft along its longitudinal axis. In both normal level or in VTOL flight, the control stick 124 commands pitch and roll moments; the rudder pedals 126 and 128, yaw; the vertical side forces buttons 138 and 140 command direct upward or downward forces respectively in a vertical direction normal to the longitudinal axis of the aircraft; and the side force buttons 142 and 144 command direct starboard and port transverse forces respectively in a direction normal to the longitudinal axis of the aircraft.

When the thrust reverser lever 134 is actuated for VTOL flight, the control stick 124 actuates the vector doors 100 and 102 in the upper or the lower sectors of the ring tails to command pitch moments; the rudder pedals 126 and 128 actuate the vector doors in the side sectors of the ring tails to command yaw moments; the vector lever 136 commands the modulation of the vectored thrust with respect to the longitudinal axis to hover the aircraft and to produce forward (or backward) motion along that axis.

In conventional aircraft, the pilot can exert independent direct control over four degrees of freedom; thrust/drag, pitch, roll, and yaw. In the aircraft of this invention, seven degrees of freedom are afforded; in addition to the conventional four degrees, the pilot can command a direct vertical upward or downward force and a direct side force; in addition, in hovering flight, a retrograde motion is available. Ring wings basically have no preferred direction of lift—the aircraft of this invention can be inverted and the pilot will still retain direct control over the seven degrees of freedom. For example, it is feasible to roll the aircraft over on its back in hovering flight and the aircraft still has the capability to gain altitude and even "back up" while so gaining altitude in the inverted position.

Figure 9:
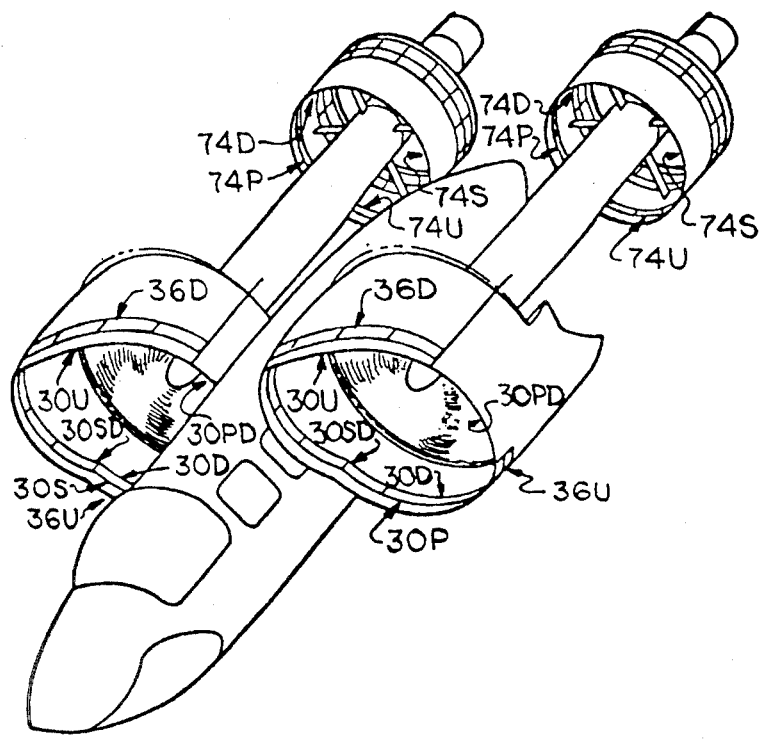
FIG. 9 is a perspective view of the flight controls for conventional flight of the aircraft of FIG. 1.
Figure 10:
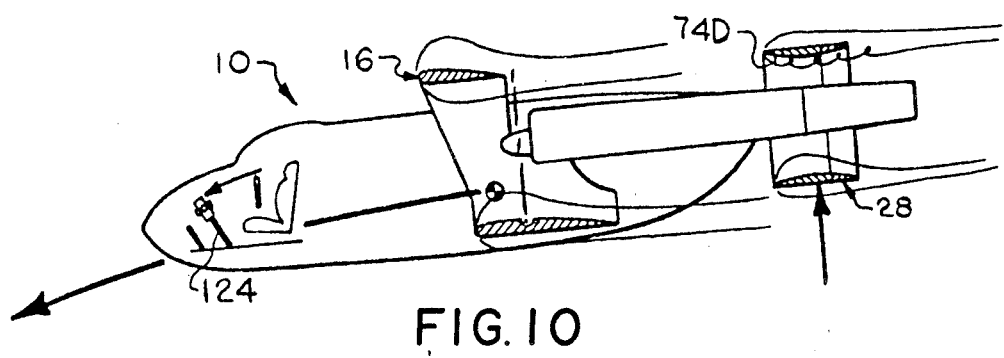
FIGS. 10 and 11 are diagrammatic side elevations partially in section showing the action of the pitch controls of the aircraft of FIG. 1 in conventional flight.
Figure 11:
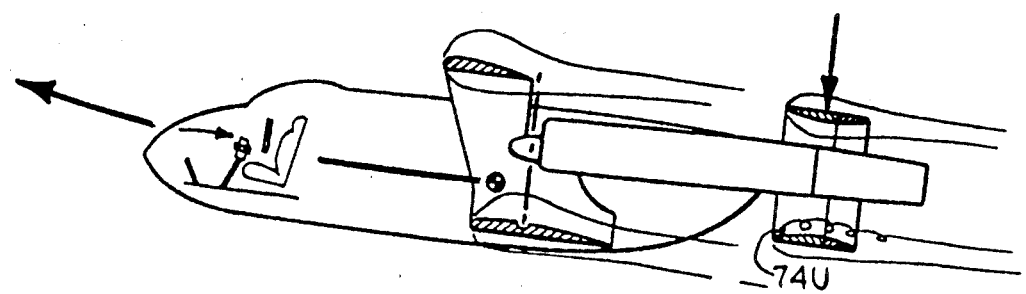

The flight control surfaces used to control the aircraft in normal cruise flight are shown in FIG. 9. In normal cruise flight, the control stick commands pitch moments by actuating the spoilers 74 in the upper and lower sectors in the inside periphery 76 of the ring tails. For nose-down moments, the control stick 124 is pushed forward, actuating the spoilers 74D in the upper sector of each of the ring tails. This action unbalances the forces on the ring tails and a resultant lift in the upward direction is generated, pitching the nose of the aircraft downward (see FIG. 10). For nose-up moments, the control stick is pulled backwards (as shown in FIG. 11), actuating the spoilers 74U in the lower sector of each of the ring tails. This action unbalances the forces acting on the ring tails, producing a lift in the downward direction, thereby pitching the nose of the aircraft upward.

It may be useful to give a brief exposition of how the actuation of a spoiler in a ring structure such as a ring tail or ring wing results in the generation of transverse forces on the structure. In operation, the propulsor fan (or the forward velocity of the aircraft) moves fluid at a higher velocity across the inside surface of the ring structure than fluid moves across the outside surface thereof due to any motion of the vehicle. The differences in relative fluid velocities result in pressures that are lower on the inside surface than the pressures on the outside surface. Actuating a spoiler in a sector in the bore of the ring causes a separation of the flow that effectively diminishes the lift in that sector. Diminishing the lift in one inside sector of the ring causes a pressure rise in that region with respect to the lower pressures existing in the other sectors in which the flow over the ring surface is undisturbed. A pressure rise in a particular sector in the throat of the ring airfoil relative to the lower pressures in the other sectors, coupled with the relatively higher pressures prevailing circumferentially on the outside of the shroud, produces an unbalance in the forces acting on the ring. Because of this pressure unbalance, there will be a net force acting on the ring structure, the vector of the force passing radially outward through the sector in which the spoiler is activated. This force acts normal to the longitudinal axis of the fluid flowing through the ring.

To roll the aircraft in normal cruise flight, the control stick activates the spoilers 30 in the lower sectors in the throats of the ring wings. A roll to starboard is accomplished by moving the stick to the right, actuating the spoilers 30S in the lower sector of the starboard wings. This action results in a lift spoiling for the starboard wing and the aircraft consequently will roll to starboard. A roll to port is commanded, of course, by moving the control stick to the left, actuating spoilers 30P, to spoil the lift of the port wing to produce a roll to port.

For yaw moments in normal cruise flight, the rudder pedals actuate spoilers in the side sectors in the throats of the ring tails. To yaw the aircraft to starboard, the right-hand rudder pedal 128 is depressed, actuating the spoilers 74S in the port side sectors in the throat of each of the tails. This action unbalances the forces on the tails producing a resultant force to port which swings the nose of the aircraft to starboard. The operating principles for yawing the aircraft to port are the same, with the left-hand side rudder pedal 126 actuating spoilers 74P in the starboard sectors in the tails.

A direct lateral force in normal cruise flight without aircraft rotation is commanded by the side force buttons located on either side of the hand grip of the control stick. Depressing button 142 on the left side of the stick causes spoilerss 30SD in the starboard side sector in the throat of each of the ring wings to be actuated. This unbalances the forces acting laterally on the wings to thereby produce a side force that causes the aircraft to move to starboard. The rudder pedals are used to stop or modulate yaw rotation at such time the side forces are being generated by the wings. A direct lateral force to port is commanded by depressing the button 144 on the right side of the stick to cause the spoilers 30PD in the port side sectors of each of the wings to induce a side force to port.

A direct vertical force without aircraft rotation in normal cruise flight is commanded by depressing selectively the vertical side buttons on the front and back of the hand grip of the control stick. Depressing the button 140 on the rear of the control stick actuates the spoilers 36D on the upper surfaces of the top sector and the spoilers 30S and 30P in the lower sector in the throat of each of the ring wings. This action spoils the lift of the wings, producing a downward force on the aircraft. The modulation or prevention of rotation in pitch is controlled in the usual manner by the control stick. A direct vertical upward force in cruise flight is commanded by depressing the button 138 on the front of the hand grip of the control stick. This action actuates the spoilers 30U in the upper sector in the throat and the spoilers 36U in the lower sector on the outside of each of the wings. It will be appreciated that the spoilers that have been actuated are extended into the flow over the wing surfaces opposite those that are producing the forces that are lifting the aircraft. The spoilers will, therefore, disturb the flow thereover and will stagnate that flow. This increases the pressure on the surfaces over which the flow is disturbed, adding to the lift being generated on the opposite upper surfaces. Thus, although there will be an increase in drag, the added lift will produce a direct vertical force that augments the lift that has maintained the aircraft in cruise flight. Again, the prevention or modulation of rotation in pitch is controlled in the normal manner by use of the control stick.

To initiate the VTOL mode of flight, the thrust reverser lever 134 is actuated, deploying the boocker door system 82, the thrust vectoring door system 80, the clamshell door system 68, and the leading edge slats 44. Flow due to the travel of the aircraft and the propulsor slipstream through the empennages is blocked by the blocker doors 88 and is directed through the thrust vectoring doors 100 and 102. The tail door vector lever 136 is set to adjust collectively the thrust vector of the flow through the vectoring doors to bring the aircraft into the hover mode and to control travel in the forward or rearward direction along the longitudinal axis.

Selective adjustment of individual pairs of the vectoring doors are mediated by the control stick and rudder pedals for directional control. Extending th leading edge flaps reduces or stagnates possible flow across the under surfaces of the wings to induce to the greater extent possible static pressure conditions thereunder such that the pressure differential between the upper and lower surfaces of the wings are accentuated.

Figure 12:
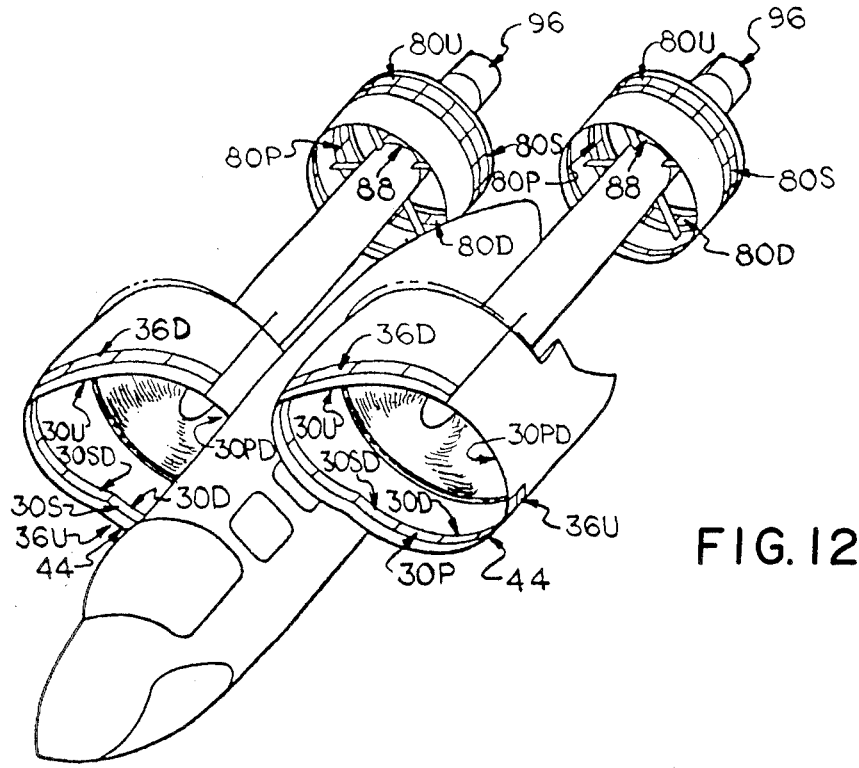
FIG. 12 is a perspective view of the flight controls for VTOL flight of the aircraft of FIG. 1.
Figure 13:
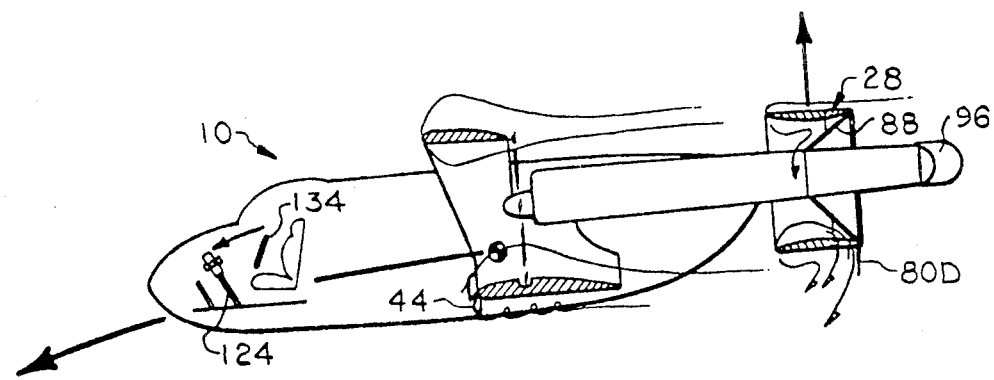
FIGS. 13 and 14 are diagrammatic side elevations partially in section showing the action of the pitch controls of the aircraft of FIG. 1 in VTOL flight.
Figure 14:
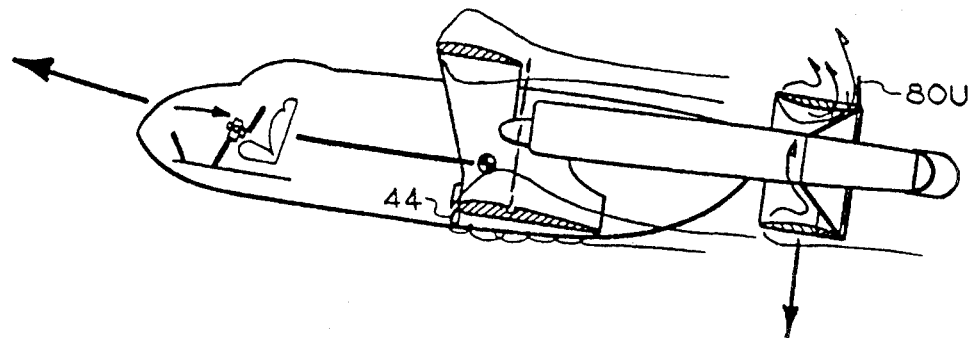

The flight controls used to control the aircraft in VTOL flight are shown in FIG. 12. To produce control moments in pitch and yaw in the VTOL mode, the peripheral doors of vectoring door system 80 in the ring tails are closed selectively.by commands generated by movements of the control stick and rudders to thereby unbalance the forces on the tails. To pitch the nose downward, the control stick is pushed forward, closing the peripheral doors 80U in the upper sector of each of the ring tails. The thrust produced by the propulsor fan efflux issuing throught the lower doors 80D in each of the tails is no longer counteracted by the thrust that had been produced by the efflux through the upper doors and the resultant unbalanced force on the tails thrusts the tail of the aircraft upwards (See FIG. 13), causing the nose to pitch downwards. To pitch the aircraft nose upwards, the stick is pulled backwards, closing the doors 80D in the lower peripheral sectors and opening doors 80U of each of the ring tails (See FIG. 14). The resultant unbalance of thrusts forces the tails downward, causing the aircraft to nose up.

For yaw control in the VTOL mode, the rudder pedals actuate the peripheral doors selectively in the side sectors of each of the ring tails. To produce a yaw to starboard, the right hand rudder pedal is depressed, causing the peripheral doors 80S in the port side sector of each of the tails to be closed; the resultant unbalanced forces on the tails thrust them to port, swinging the nose of the aircraft to starboard. Yaw moments to port are commanded by the left rudder pedal which actuates the peripheral doors 80P in the tails to swing the nose of the aircraft to port.

Roll moments in the VTOL mode are controlled by lateral movements of the control stick. As in cruise flight, moving the control stick to one side actuates spoilers 30S or 30P in the lower sector in the throat of the ring wing on that side to spoil the lift such that the aircraft rolls to that side.

Direct side forces in the VTOL mode of flight are commanded by depressing the buttons 142 and 144 on the sides of the hand grip of the control stick. As in cruise flight, commands initiated by the buttons actuate spoilers 30SD or 30PD in each of the ring wings; however, in VTOL, commands initiated by the rudder pedals actuate the peripheral doors 80S or 80P rather than spoilers as in cruise flight in the ring tails to stop or modulate aircraft yaw rotation during the generation of direct side forces.

In the VTOL mode, the aircraft travels directly upwards or downwards with control in pitch and yaw being governed as in conventional flight by the control stick and rudder pedals respectively. To take off, the thrust reverser lever 134 is moved to deploy the blocker doors, the clamshell doors, and the leading edge slats, and the engine throttles are advanced to generate an airflow over the lifting surfaces. When the propulsor fans move air over the lifting surfaces at a rate sufficient to generate a lift force greater than the weight of the aircraft, it begins to ascend. Whenever there is a change in the engine throttle settings, the tail door vector lever 136 is adjusted accordingly to stop or modulate travel along the longitudinal axis of the aircraft. If it is desired to increase the rate of ascent at a specific throttle setting, the vertical force button 138 on the front of the control stick is depressed. This action causes spoilers 30U and 36U in the upper sector in the throat and the lower sector on the outside of each of the ring wings respectively to be actuated to slow or stagnate the flow over those surfaces, thereby increasing the pressure thereon such that greater lift is produced. Increases in the rate of ascent are also produced by further opening the throttles to provide added lift due to the heightened blowing effect of the propulsors. Horizontal translation along the longitudinal axis of the aircraft is stopped or modulated by moving tail door vector lever 136 to adjust the thrust vector of the propulsor efflux issuing from the ring tail peripheral doors to obtain the desired vertical flight path.

Figure 15:
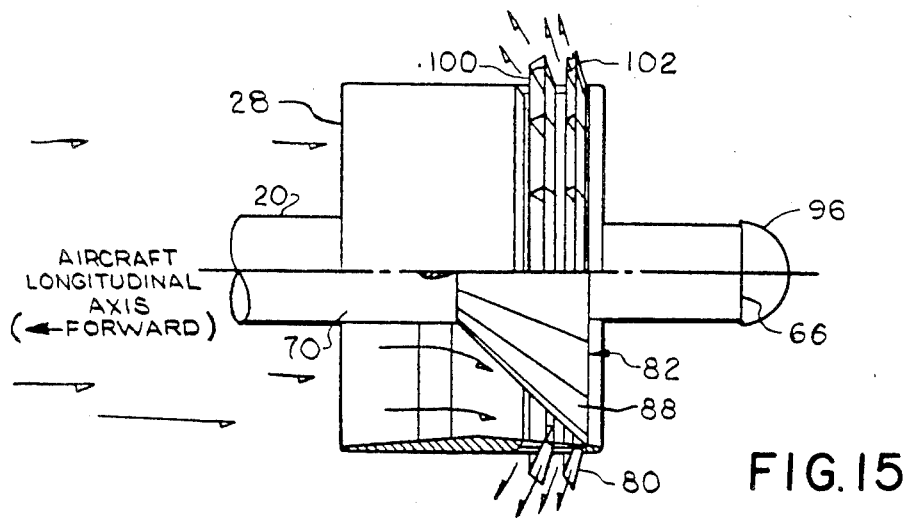
FIGS. 15, 16, and 17 are fragmentary side elevations partially in section of the peripheral door system of the empennage of the aircraft of FIG. 1 in different phases of propulsor thrust modulation.
Figure 16:
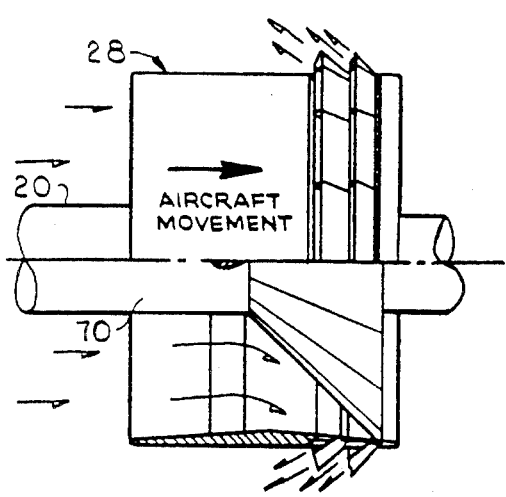
Figure 17:
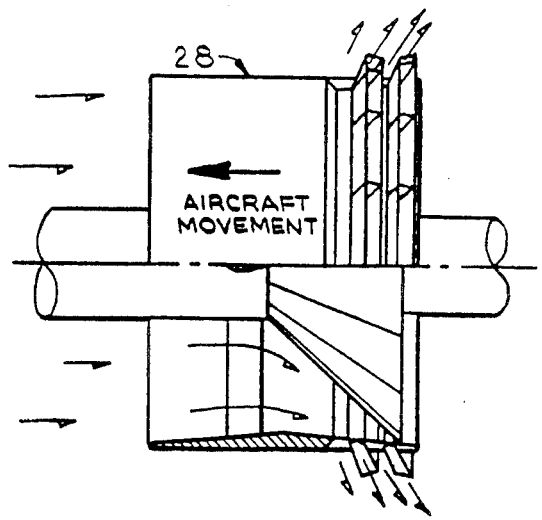

The thrust vector of the wing tail peripheral doors has an angular range that will selectively permit rearward translation of the aircraft; that is, it can be "backed up" in vertical flight or while hovering (See FIGS. 15–17). Direct downward travel in the VTOL mode is regulated either by thottling back the propulsion engines to reduce the lift generated by the propulsor efflux over the lifting surfaces, or by pressing the vertical force button 140 on the rear of the hand grip of the control stick. Actuating the vertical force button causes spoilers 36D on the top sector on the outside of the wings and the spoilers 30S and 30P in the bottom sector in the throat of the wings to deploy to thereby spoil controllably the lift of the wings. Use of the vertical force button thus permits vertical landing approaches to be made using full engine power. Lift is decreased smoothly by the spoilers such that a controlled vertical descent is made to a landing. However, the spoilers can be retracted at any time during the descent and the lift being continuously generated by the flow induced over the lifting surfaces by the propulsors will arrest downward motion and the aircraft will hover or can be caused to ascent vertically. Because of the continuous induction of flow by the propulsors over the lifting surfaces, transition to normal cruise flight from the VTOL mode of flight can be made at any time by simply moving the thrust reverser lever 134 to stow the blocker doors, the clamshell doors, and the leading edge slats. The transition from VTOL to conventional flight (and vice versa) is made without a change in the flight attitude of the aircraft and without a loss in altitude.

Figure 18:
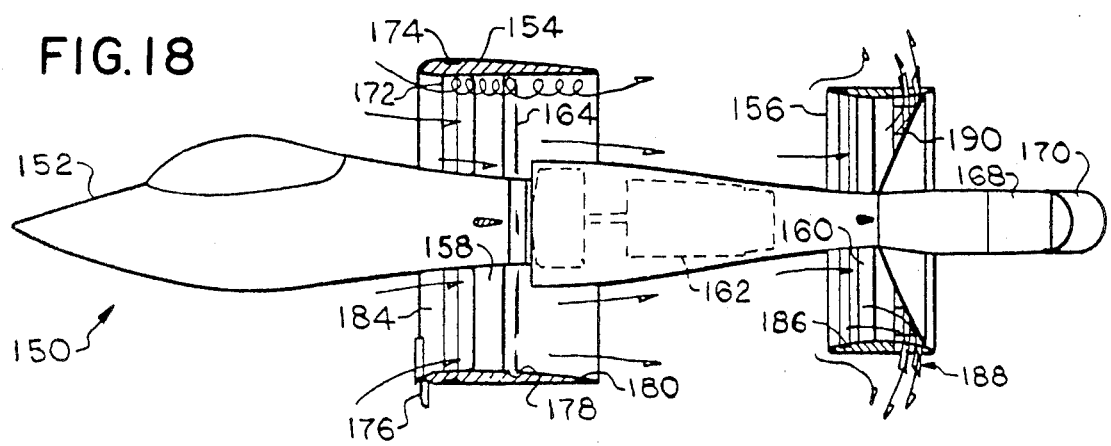
FIG. 18 is a side elevation partially in section of a further embodiment of the VTOL aircraft of the invention in the VTOL flight configuration.
Figure 19:
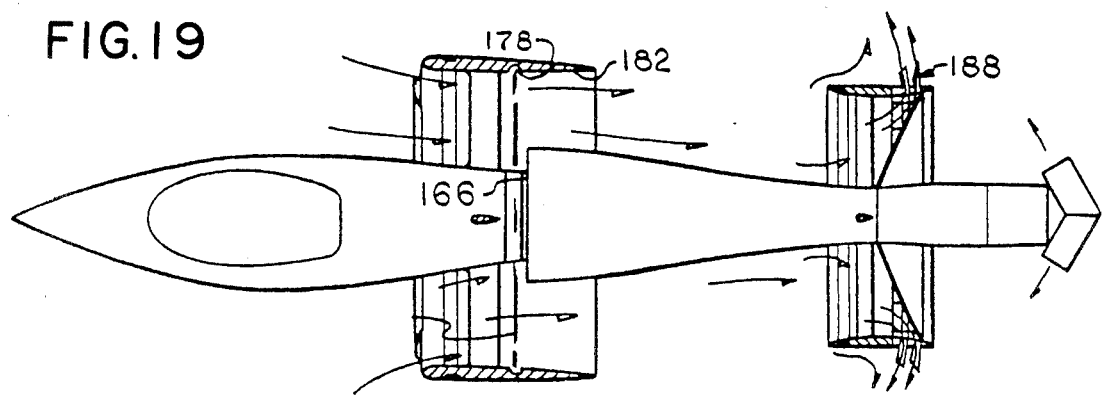
FIG. 19 is a top plan view partially in section of the aircraft embodied in FIG. 18.
Figure 20:
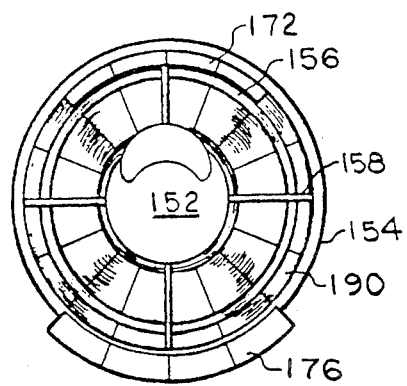
FIG. 20 is a front elevation of the aircraft embodied in FIG. 18.

In addition to the twin wing and propulsor aircraft embodiment described previously herein, the invention can be embodied in an aircraft 150 having a single wing and propulsor. As shown in FIGS. 18–20 illustrating the aircraft in its VTOL mode, such embodiment has a fuselage 152 with a single ring wing 154 and a single ring tail 156 fixed coaxially there-around by suitable strut arrangements 158 and 160 respectively. Propulsion is provided by a suitable engine 162 driving a propulsion fan 164. The engine has an air intake 166 and a tail pipe 168 which is provided with a clam-shell door type thrust attenuator 170. Aircraft 150 is provided with the usual appurtenances such as landing gear and the like (not shown) and has a cockpit with a pilot's position and controls identical with those of aircraft 10. To avoid prolixity herein, reference should be made, therefore, to the drawings and description of the aircraft 10 embodiment for an understanding of the controls and control system of the aircraft 150 embodiment.

With respect to the single ring wing 154 of this embodiment, its design and construction is identical to ring wing 14 or 16 of the FIG. 1 embodiment and deployable inside spoilers 172, outside spoilers 174 and circulation control slats 176 are provided. An annular groove 178 which extends about the lower 180 and side 182 sectors in the throat 184 of the wing can be provided to accommodate the tips of the fan to counter problems with clearance, tip losses, and vibration. The empennage system 156 of this embodiment also is identical in design, construction, and operation to that of the aircraft 10 of FIG. 1. Thus, the empennage system 156 will have spoilers 186, a thrust vectoring door system 188, and a tail blocker door system 190. Actuation of the various elements of the ring wing and the empennage system by means of the pilot's controls to control the aircraft will be readily understood, with variations that will be obvious in light of the single wing and tail of aircraft 150, if reference is made to the exposition of the operation of aircraft 10 embodied in FIG. 1. It will also be understood that the spoilers used for control of the aircraft, particularly in the side sectors of the wing and, if need be, the tail, will be properly segmented such that they can be used to produce roll moments.

It will also be appreciated that the invention can be embodied in a channel wing or a wing having an arcuate configuration less than a closed ring wing. Aircraft 200, as shown in FIGS. 21–23, has a channel wing 202 mounted on its fuselage 204 by a suitable strut arrangement 206. In this embodiment, the propulsion system has counter-rotating fans 208 and 210 and ring-foil flow straightening means 212 to insure proper flow to the empennage 214, but in every other respect it is identical to aircraft 150 embodied in FIGS. 18–20 except for variations in construction and control incidental to a channel wing. It will also be appreciated that channel wings can be fitted to aircraft 10 instead of wing wings 14 and 16.

Although shown and described in what are believed to be the most practical and preferred embodiments, it is apparent that departures from the specific methods and apparatus described will suggest themselves to those skilled in the art and may be made without departing from the spirit and scope of the invention. I, therefore, do not wish to restrict myself to the particular instrumentalities illustrated and described, but desire to avail myself of all modifications that may fall within the compass of the appended claims.

Having thus described my invention, what I claim is:

1. In a VTOL aircraft having a longitudinally extending load-carrying fuselage with alighting means, said fuselage having a nose and an after end and having controls for the operation of said aircraft, the improvement comprising; arcuate airfoil surfaces fixedly attached to said fuselage, annular empennage means including fixed airfoil surfaces at said after end of said fuselage, the chords of said airfoil surfaces being substantially parallel to said longitudinal axis of said aircraft, said longitudinal axis and said fixed airfoil surface chords normally being maintained in a substantially horizontal orientation during substantially all phases of VTOL flight and during transition to conventional flight, a power plant driving propulsion means for generating a high-velocity slipstream essentially rearwardly and substantially parallel to said longitudinal axis, said propulsion means having the capability for imparting forward motion to said aircraft, said slipstream passing over said airfoil surfaces to generate lift forces by top surface blowing, said slipstream producing a flow over said empennage airfoil surfaces to generate lift forces thereby, first control means on said arcuate airfoil surfaces for operating on the flow to selectively control the pressure thereover to direct selectively the flow induced radial lift forces generated thereby, second control means on said empennage airfoil surfaces for operating on the flow to selectively control the pressure thereover to direct selectively the flow induced radial lift forces generated thereby, and flow vectoring means in said empennage means for individually and collectively reacting and vectoring selectively the thrust forces generated by said flow; whereby, for conventional flight, said propulsion means propels said aircraft such that the forward velocity thereof produces a flow over said airfoil surfaces that contributes lift for flight and said first control means on said arcuate airfoil surfaces and second control means on said annular empennage airfoil surfaces vector said lift radially to provide directional control and, whereby, for VTOL flight, said propulsion means produces a high-velocity flow over said arcuate airfoil surfaces to generate lift for flight by top surface blowing and said flow vectoring means in said annular empennage blocks the flow therethrough to react and vector the slipstream from said propulsion means radially to provide directional control in coordination with said first control means and to react selectively said thrust produced by said propulsion means to regulate horizontal travel of said aircraft such that controlled vertical flight results.

2. The VTOl aircraft defined in claim 1 wherein the airfoil surfaces are a ring wing structure and wherein the empennage airfoil surfaces are a ring tail structure such that the lift forces generated thereby are substantially radial forces.

3. The VTOL aircraft defined in claim 2 wherein the first and second control means are spoilers on at least the inside surface of the airfoil surfaces and the empennage airfoil surfaces respectively.

4. The VTOL aircraft defined in claim 3 wherein the spoilers are annularly segmented and wherein the segments are both individually and collectively actuated.

5. The VTOL aircraft defined in claim 2 wherein the first and second control means are spoilers on at least the outside surface of the airfoil surfaces and the empennage airfoil surfaces respectively.

6. The VTOL aircraft defined in claim 5 wherein the spoilers are annularly segmented and wherein the segments are both individually and collectively actuated.

7. The VTOL aircraft defined in claim 1 wherein the airfoil surfaces are an upwardly open channel wing structure and wherein the empennage airfoil surfaces are a ring tail structure such that the lift forces generated thereby are substantially radial forces.

8. The VTOL aircraft defined in claim 7 wherein the first and second control means are spoilers on at least the inside surface of the airfoil surfaces and the empennage airfoil surfaces respectively.

9. The VTOL aircraft defined in claim 8 wherein the spoilers are annularly segmented and wherein the segments are both individually and collectively actuated.

10. The VTOL aircraft defined in claim 7 wherein the first and second control means are spoilers on at least the outside surface of the airfoil surfaces and the empennage airfoil surfaces respectively.

11. The VTOL aircraft defined in claim 10 wherein the spoilers are annularly segmented and wherein the segments are both individually and collectively actuated.

12. The VTOL aircraft defined in claim 1 wherein the airfoil surfaces are fixed on either side of the fuselage and wherein a nacelle is fixedly associated with each of said airfoil surfaces and extends rearwardly therefrom, each of said nacelles having a nose and an after end with the longitudinal axes of said nacelles lying substantially parallel to said longitudinal axis of said fuselage, the propulsion means being located in the nose and the empennage means being located in the after end of each nacelle.

13. The VTOL aircraft defined in claim 1 wherein the flow vectoring means in the empennage are means for turning said high-velocity flow from its essentially rearwardly direction to a direction which selectively reacts the thrust generated by said flow such that motion along the longitudinal axis of said aircraft and about its pitch and yaw axes is controlled.

14. The VTOL aircraft defined in claim 13 wherein the empennage includes a ring tail and wherein the flow vectoring means in said empennage comprise blocker doors and individually and collectively actuated flow vectoring doors, the blocker doors being deployable to block the flow through said ring tail and to direct it radially outwards through the flow vectoring doors in the periphery of said ring tail such that the output thrust is vectored for control functions.

15. The VTOL aircraft defined in claim 2 wherein the propulsion means is a fan operating in the bore of the ring wing intermediate its leading and trailing edges.

16. The VTOL aircraft defined in claim 7 wherein the propulsion means is a fan operating in the channel of the channel wing intermediate its leading and trailing edges.

17. A VTOL aircraft comprising:
a fuselage;
airfoil surfaces fixedly attached to said fuselage with the chords of said airfoils oriented in a plane substantially parallel to the longitudinal axis of said fuselage;
propulsion means for producing a high-velocity airflow over said airfoil surfaces such that lift sufficient to sustain said aircraft is generated by top surface blowing in the absence of forward travel;
annular empennage means downstream of said propulsion means and immersed in the efflux therefrom;
control means associated with said airfoil surfaces to vary the flow over sectors thereof selectively to control the pressure thereover and to radially vector lift generated thereby for control purposes;
control means associated with said empennage means to vary the flow over sectors thereof selectively during substantially horizontal flight to control the pressure thereover and to radially vector lift generated thereby for directional control; and
flow vectoring means in the bore of said annular empennage means comprising blocker doors and individually and collectively actuated flow vectoring doors for blocking the flow therethrough and for selectively directing said blocked flow to control flight direction and speed, said blocking doors means reacting the propulsion efflux produced thrust and directing it radially outwards through the flow vectoring doors spaced equally around the periphery of said ring tail whereby forward travel during the generation of lift by propulsion-means produced efflux over said airfoil surfaces is regulated such that controlled vertical flight by said aircraft with its longitudinal axis maintained in a substantially horizontal orientation is achievable without forward travel.

18. A VTOL aircraft comprising:

a fuselage;

arcuate airfoil means comprising at least an annular wing fixedly fastened to said fuselage with the airfoil chord oriented in a plane substantially parallel to the longitudinal axis of said fuselage;

annular empennage means;

aerodynamic control means on said airfoil means and said empennage means for regulating the pressure thereon and for producing radial control forces thereon;

propulsion means associated with said airfoil means for producing a high-velocity slipstream thereover for generating lift in vertical flight by top surface blowing, the slipstream from said propulsion means passing at least through the bore of said empennage means; and flow vectoring means comprising blocker door means in said bore of said empennage means for selectively reacting thrust produced by said slipstream from said propulsion means and directing said slipstream outwards through flow vectoring doors spaced equally around the entire periphery of said empennage means such that forward travel by said aircraft is controlled during the generation of lift by top surface blowing by said slipstream over said airfoil surfaces whereby vertical flight with said aircraft's longitudinal axis maintained in a substantially horizontal orientation and without forward travel is achieved.

19. The VTOL aircraft defined in claim 17 wherein said arcuate airfoil means comprises at least an upwardly open channel wing.

* * * * *